United States Patent
Sivaprakasam

(10) Patent No.: US 10,120,812 B2
(45) Date of Patent: Nov. 6, 2018

(54) MANIPULATION OF VIRTUAL MEMORY PAGE TABLE ENTRIES TO FORM VIRTUALLY-CONTIGUOUS MEMORY CORRESPONDING TO NON-CONTIGUOUS REAL MEMORY ALLOCATIONS

(71) Applicant: Nutanix, Inc., San Jose, CA (US)

(72) Inventor: Suresh Sivaprakasam, Saratoga, CA (US)

(73) Assignee: Nutanix, Inc., San Jose, CA (US)

( * ) Notice: Subject to any disclaimer, the term of this patent is extended or adjusted under 35 U.S.C. 154(b) by 147 days.

(21) Appl. No.: 15/015,054

(22) Filed: Feb. 3, 2016

(65) Prior Publication Data

US 2017/0220482 A1    Aug. 3, 2017

(51) Int. Cl.
| G06F 12/00 | (2006.01) |
| G06F 12/1009 | (2016.01) |
| G06F 12/1027 | (2016.01) |
| G06F 12/02 | (2006.01) |

(52) U.S. Cl.
CPC ........ *G06F 12/1009* (2013.01); *G06F 12/023* (2013.01); *G06F 12/1027* (2013.01); *G06F 2212/1044* (2013.01); *G06F 2212/657* (2013.01); *G06F 2212/68* (2013.01)

(58) Field of Classification Search
CPC .............. G06F 12/1009; G06F 12/023; G06F 12/1027; G06F 2212/1044; G06F 2212/657; G06F 2212/68
See application file for complete search history.

(56) References Cited

U.S. PATENT DOCUMENTS

| 7,539,134 B1* | 5/2009 | Bowes ................. H04L 1/0072 370/230 |
| 7,895,410 B1* | 2/2011 | Wu ..................... G06F 12/1009 711/203 |
| 2001/0007112 A1 | 7/2001 | Porterfield |
| 2003/0018876 A1 | 1/2003 | Zahir et al. |

(Continued)

OTHER PUBLICATIONS

International Search Report and Written Opinion dated May 19, 2017 for corresponding PCT Patent Application No. PCT/US2017/016569, 14 pages.

*Primary Examiner* — Nanci N Wong
(74) *Attorney, Agent, or Firm* — Vista IP Law Group, LLP

(57) ABSTRACT

Systems and methods for managing contiguous addressing via virtual paging registers in a page table used in a high-performance computing platform. One embodiment commences upon initializing a first paging register with a first virtual address of a first virtual address length to form a first virtual address space, then receiving a request from a process to allocate physical memory corresponding to a second virtual address request. A memory allocator allocates the requested physical memory from a physical memory location determined by the memory allocator. An operating system or other sufficiently privileged access identifies a second paging register that is contiguously adjacent to the first paging register. If the second paging register is already in use, then the method identifies an unused (third) paging register into which the contents of the second paging register can be relocated. The method stores the second virtual address into the now freed-up second paging register.

21 Claims, 12 Drawing Sheets

(56) References Cited

U.S. PATENT DOCUMENTS

| | | | | |
|---|---|---|---|---|
| 2007/0112999 A1* | 5/2007 | Oney | G06F 21/53 | 711/6 |
| 2009/0327647 A1* | 12/2009 | Ingle | G06F 12/1027 | 711/207 |
| 2014/0223090 A1* | 8/2014 | Malone | G11C 19/00 | 711/104 |
| 2015/0220481 A1* | 8/2015 | Tanimoto | G06F 12/1081 | 711/128 |
| 2015/0280913 A1* | 10/2015 | Smart | G06F 12/1408 | 713/193 |
| 2017/0185528 A1* | 6/2017 | Hansson | G06F 12/1036 | |

* cited by examiner

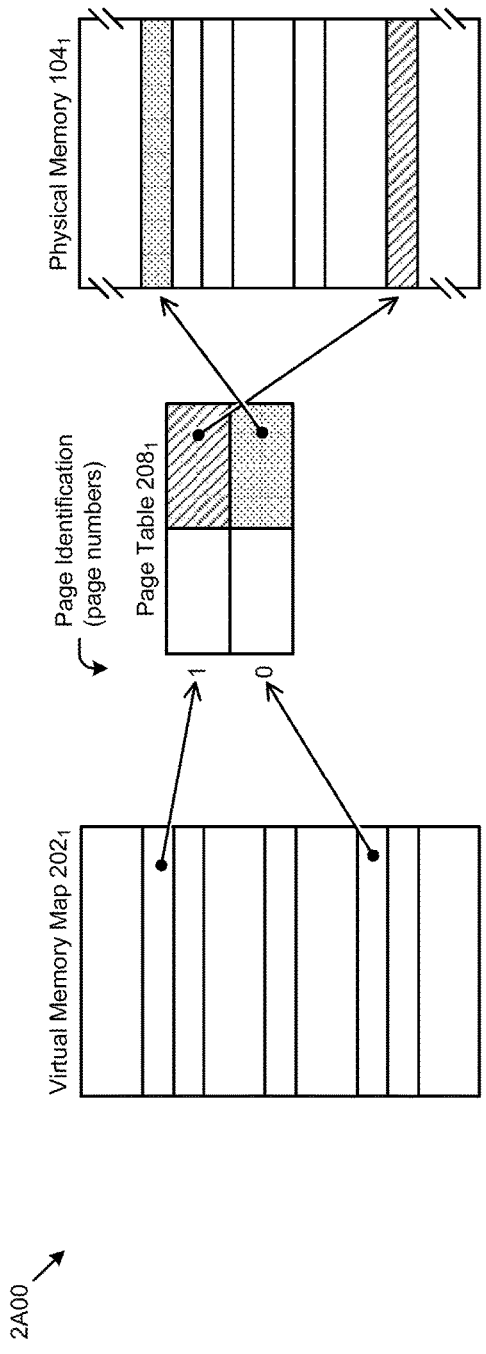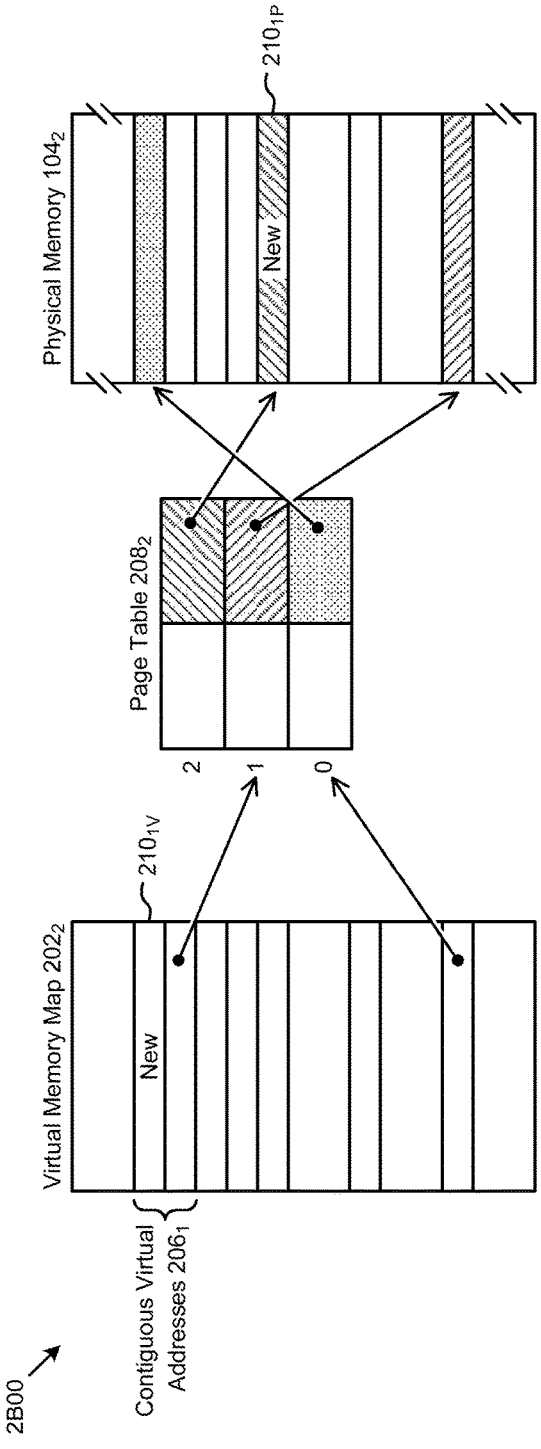

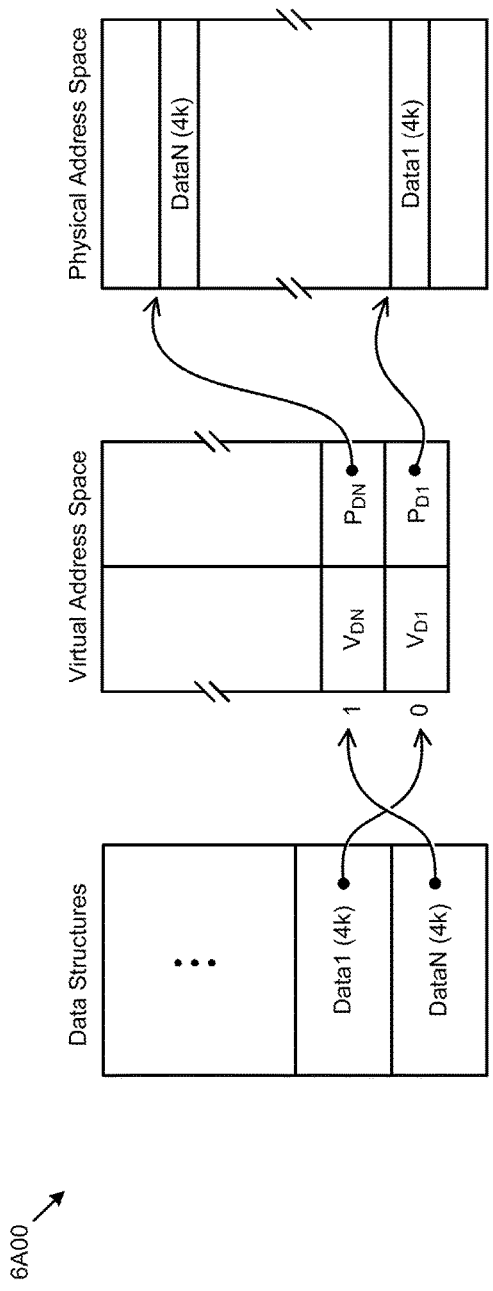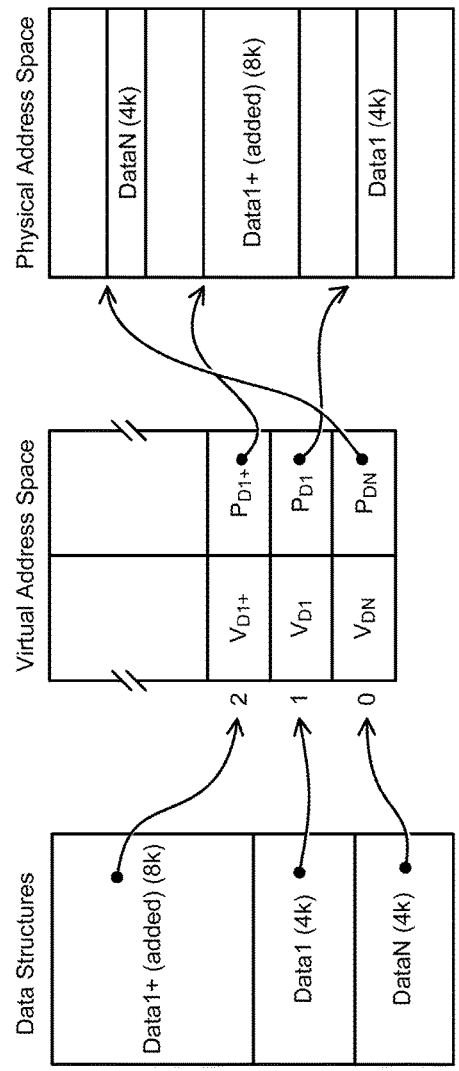
FIG. 6A
FIG. 6B

MANIPULATION OF VIRTUAL MEMORY PAGE TABLE ENTRIES TO FORM VIRTUALLY-CONTIGUOUS MEMORY CORRESPONDING TO NON-CONTIGUOUS REAL MEMORY ALLOCATIONS

FIELD

This disclosure relates to high-performance computing, and more particularly to techniques for manipulation of virtual memory pages to form virtually-contiguous memory ranges.

BACKGROUND

Modern computing platforms include data processors (e.g., CPUs) that are integrated with caching subsystems. Such caching subsystems serve to reduce memory access latency as experienced by the processor when fetching contents of off-chip memory. Some platforms include data processors that fetch instructions and data in quanta that prospectively prefetch instructions and data, and place such prospectively prefetched instructions and data into cache (e.g., an instruction cache or a data cache, or a mixed instruction and data cache). In the case of instruction prefetch the inherent prefetch philosophy is that it is more likely than not that the next instruction to be executed would be found at the next higher address. This instruction look-ahead prefetch philosophy proves to be empirically true; that is, if a processor instruction at real memory address "A000" is currently being executed by the processor, then is it more likely than not that the next instruction to be executed will be at address "A000" plus 1. However, regarding data prefetching, the legacy look-ahead prefetch philosophy often fails in situations where real memory is dynamically allocated (e.g., using a dynamic memory allocation call such as malloc( )). Legacy memory allocation schemes operate under a best-fit philosophy and merely allocate an area of real memory without regard to whether or not the allocated area of real memory is contiguous to any previously allocated area of real memory.

In many applications (e.g., databases, networking, etc.) large areas of real memory are allocated dynamically during processing of the application, and in many such applications the application processing proceeds sequentially through the allocated memory. Unfortunately, since legacy memory allocation schemes operate without regard to whether or not the allocated area of real memory is contiguous to any previously allocated area of real memory, the processor's caching subsystem often prefetches data that is not so likely to be used. This has undesirable effects: (1) prefetched data may evict data that is frequently accessed by the application, thus at least potentially incurring undesirable memory latency; and (2) during prospective prefetch, data contents other than the next-to-be-accessed data is prefetched, which would at least potentially mean that memory fetch cycles are wasted, and also might mean that the processor will have to incur further memory fetches to retrieve the data that is in fact the actual next-to-be-processed data.

Some legacy prefectchers prefetch data found at the physical memory addresses corresponding to the 'next' virtual memory segment on the assumption that a prefetch to retrieve data corresponding the 'next' virtual memory segment is going to prefetch data that is likely to be used 'next'. This assumption might be sometimes true and might be sometimes false. What is needed is a way to improve the likelihood that prefetching data found at the physical memory addresses corresponding to the 'next' virtual memory is indeed going to be the 'next' to be accessed data. One way to increase the likelihood that the 'next' to be accessed data is going to be used is (for example) to recognize what is next segment in a virtual memory space, and then manipulate memory pointers accordingly. Unfortunately, legacy techniques fail to recognize what constitutes a 'next' segment in a virtual memory space, and thus those legacy techniques exhibit lower than desired actual use of the prefetched data.

What is needed is a technique or techniques to improve over legacy approaches.

BRIEF DESCRIPTION OF THE DRAWINGS

The drawings described below are for illustration purposes only. The drawings are not intended to limit the scope of the present disclosure.

FIG. 2A exemplifies a non-contiguous memory mapping scenario.

FIG. 2B exemplifies a page table memory mapping technique.

FIG. 6A and FIG. 6B present a sequence of data structure values as used in systems that implement concatenation of virtual memory pages to form virtually-contiguous memory ranges, according to an embodiment.

DETAILED DESCRIPTION

Figure 1:
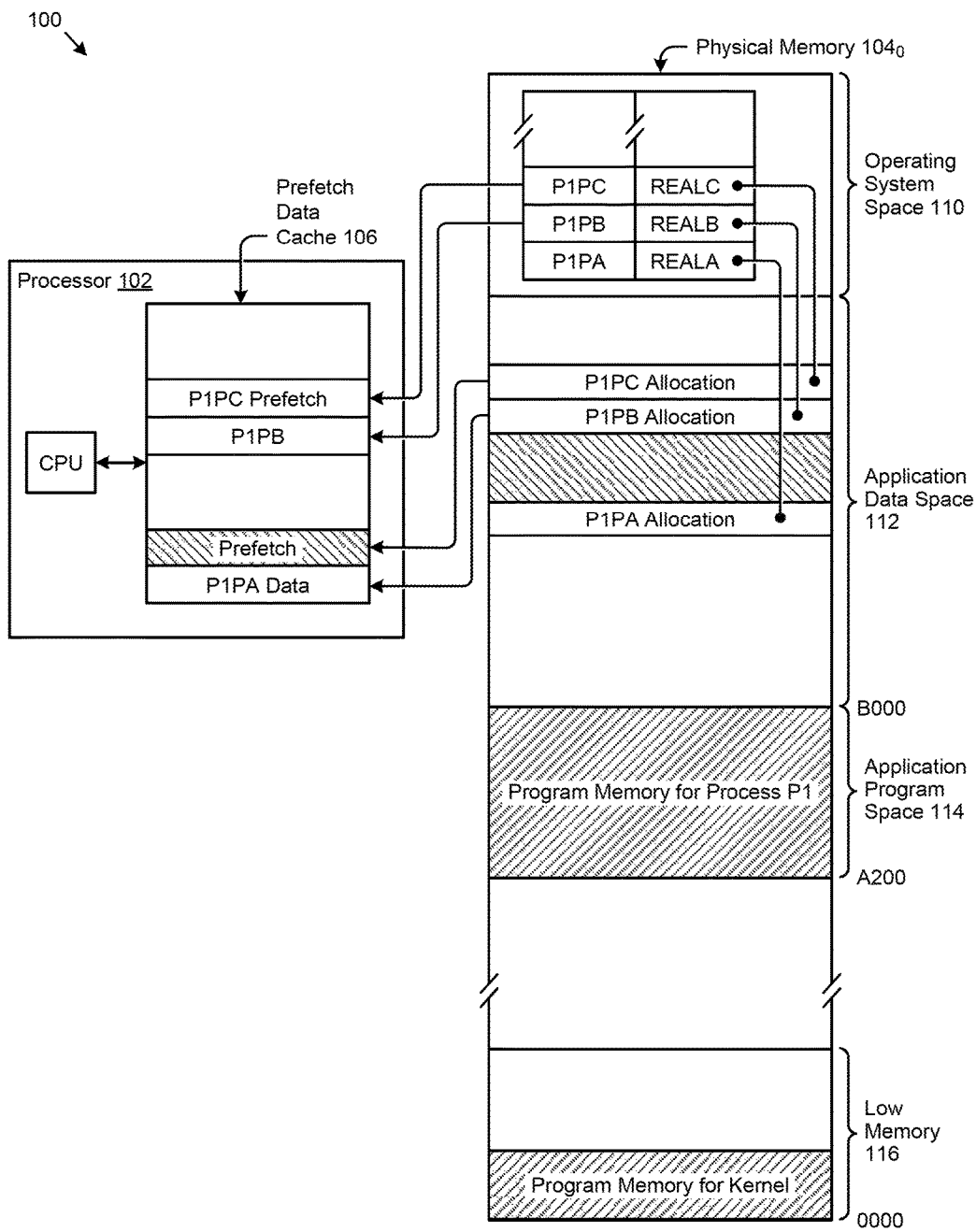
FIG. 1 exemplifies a processor subsystem having a multi-level prefetch cache.

Some embodiments of the present disclosure address the problem of memory allocation schemes that allocate areas of real memory without regard to whether or not the allocated area of real memory is physically or virtually contiguous. Such prefetch-ignorant allocation schemes often defeat processor prefetch capabilities. Thus, embodiments disclosed herein are directed to approaches for providing a memory allocator and interfaces thereto that manage pages of memory in a manner that results in virtually contiguous memory areas that are prefetched by processor prefetch subsystems. More particularly, disclosed herein and in the accompanying figures are exemplary environments, systems, methods, and computer program products for concatenation of virtual memory pages to form virtually-contiguous memory ranges.

Overview

Many applications can take advantage of a memory allocation scheme that returns contiguous areas of memory to the requestor such that a prefetching cache subsystem will prospectively prefetch data from memory areas that are highly likely to be needed by the application. One way to accomplish returning contiguous areas of memory to the requestor is to only allocate contiguous areas of real memory. This is often impracticable since it relies on the premise of availability of contiguous memory, which may or may not be true. Another way is to respond to a dynamic request for a next memory allocation is by allocating a best-fit contiguous area that is sized to include the size of dynamic request for a next memory allocation plus the previous memory allocation, and copying the data from the previously allocated memory to the newly allocated (larger) contiguous area. Unfortunately, this incurs a copy operation that is often prohibitively time-expensive. An alternative, as is disclosed herein, is to manage paging registers to form relationships between contiguous virtual address areas and corresponding physical addresses, which physical address areas need not be contiguous. The technique of using paging registers for separating virtual addresses from physical addresses has the property that virtual pages can be concatenated (e.g., to form contiguous regions of virtual memory addresses) that can be mapped to physical memory locations, which need not be contiguous.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 exemplifies a processor subsystem 100 having a multi-level prefetch cache. As an option, one or more variations of processor subsystem 100 or any aspect thereof may be implemented in the context of the architecture and functionality of the embodiments described herein. Also, the processor subsystem 100 or any aspect thereof may be implemented in any environment.

As shown, a physical memory $104_0$ is segmented into several physical memory segments, namely low memory 116, application program space 114, application data space 112, and operating system space 110. The application program space holds instructions in the form of program memory for a process (e.g., process P1, as shown in this example). The application data space is used by an application to hold data used by one or more processes in the application. In this example, the process P1 has three memory allocations, namely P1PA allocation, P1PB allocation, and P1PC allocation. The shown operating system space 110 includes a paging map that maps a memory allocation as used by the application to the allocated physical memory using a real memory physical address. The shown page map comprises memory space for page table entries, and as shown, includes three virtual areas, namely P1PA, P1PB, and P1PC, which are each mapped to physical addresses, namely REALA, REALB, and REALC. In this example, the virtual addresses P1PA, P1PB, and P1PC are depicted in a set of three contiguous page map entries. However, the corresponding physical addresses, namely REALA, REALB, and REALC are not all organized as contiguous areas. More specifically, the REALA area is not contiguous with any other allocations although physical memory REALC is contiguous in physical memory to REALB.

When instructions pertaining to process P1 are executed by the CPU of processor 102, the process P1 will make accesses to the application data space. Given a prefetch data cache 106 of the type as shown, an access to application data space memory corresponding to the P1PA would bring the memory contents of REALA into the cache memory, and the application can use the retrieved data. In a prefetch operation (e.g., as is performed in a physical address prefetch regime), the next contiguous address in the physical memory are also prefetched, based on the prefetch philosophy that the next contiguous address might be needed by the application. In the example shown, the contiguous address in the physical memory are not allocated to process P1, and thus, the prefetch operation does not return any memory contents that are useful to process P1.

This situation can be improved. Specifically, and as shown in this example, the memory areas REALB and REALC happen to be contiguous, and also happen to be assigned to virtual areas P1PB and P1PC. In this case, when a prefetch operation is performed (e.g., in a physical address prefetch regime), the next contiguous address in the physical memory are also prefetched, based on the prefetch philosophy that the next contiguous address might be needed by the application. In the example shown, the virtual address spaces P1PB and P1PC happen to be contiguous addresses in the physical memory, and thus, the prefetch operation returns the memory contents that are at least potentially useful to process P1. In this example, the allocation of the physical memory corresponding to the contiguous virtual addresses P1PB and P1PC happen to be contiguous physical addresses; however this is a matter of happenstance.

One improvement is to implement or use a processing subsystem that includes a data prefetch cache that implements a virtual address prefetch regime. Another improvement is to implement or use a memory allocation technique that observes requests by a process to allocate physical memory by assigning or moving virtual page map entries to form contiguous virtual areas. When such a memory allocation technique is used in conjunction with a processing subsystem that includes a data cache that prefetches data based on virtual addresses, then prefetch operations are more likely to fetch data that will be used by the process.

Caching Subsystem Operational Models

When a CPU such as is shown within processor 102 needs to read from or write to a location in memory (e.g., physical memory $104_0$), the cache subsystem checks to determine whether or not a copy of the needed data is in the cache. If so, the CPU can immediately read data from or write data to the cache. This condition is termed a cache "HIT". Cache HIT operations are often much faster than reading from or writing to main memory.

Most modern desktop and server CPUs have at least three independent caches: (1) an instruction cache to speed up executable instruction fetches, (2) a data cache to speed up data fetches and stores, and (3) a translation lookaside buffer (TLB) used to speed up virtual-to-physical address translations (e.g., for both executable instruction fetches and data fetches). The data cache can be organized as a hierarchy of multiple cache levels (e.g., a first L1 level, a second L2 level, etc.). In operation, instructions and/or data is transferred between memory and cache in blocks of some fixed size termed "cache lines". When a cache line is copied from memory into the cache, a cache entry is created. The cache entry may include the copied-in data as well as a tag that refers to the copied-in addresses.

Now, referring again to the aforementioned translation lookaside buffer, a set of registers are dedicated to the cache subsystem operations needed to speed up virtual-to-physical address translations. In some cases, such a set of registers are logically situated between a virtual memory map and a physical memory. Such a juxtaposition of a set of register slots that form a page table can be used to facilitate mapping of arbitrarily located areas of physical memory to a set of virtual pages. As earlier indicated, one improvement of a caching subsystem involves assigning contiguous virtual addressing areas to areas of physical memory such that prefetching cache will prefetch memory contents that are virtually contiguous, even though the respective physical memory areas are not necessarily contiguous.

FIG. 2A exemplifies a non-contiguous memory mapping scenario 2A00. As an option, one or more variations of non-contiguous memory mapping scenario 2A00 or any aspect thereof may be implemented in the context of the architecture and functionality of the embodiments described herein. Also, the non-contiguous memory mapping scenario 2A00 or any aspect thereof may be implemented in any environment.

Figure 2C:
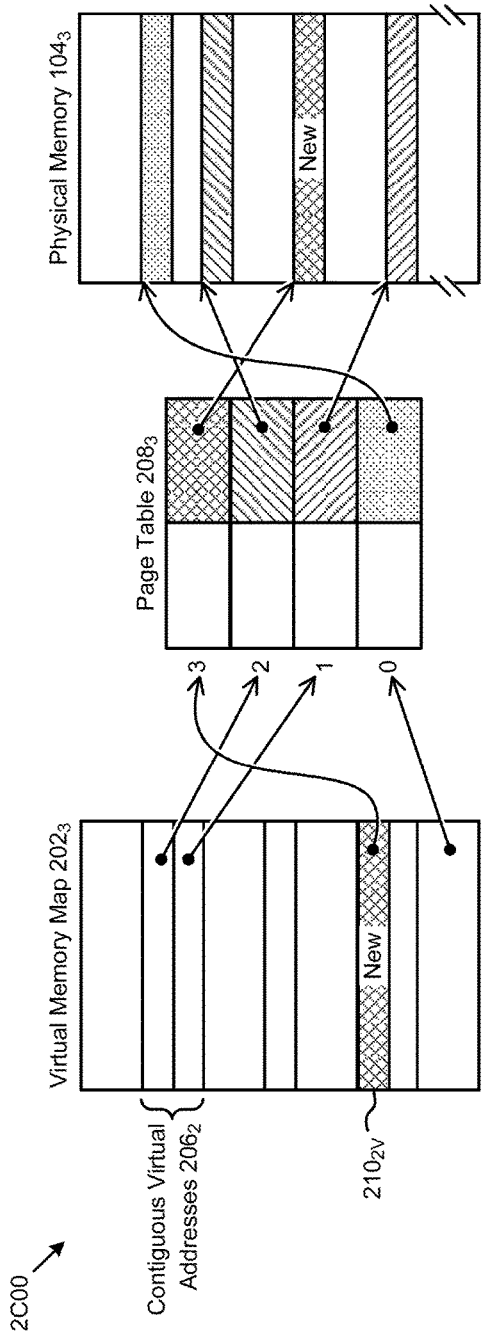
FIG. 2C depicts a non-contiguous memory demand scenario.

The embodiments shown in FIG. 2A through FIG. 2D are sequenced so as depict a representative set of memory allocations as may be demanded by a process. The virtual memory map $202_1$ depicts two virtual memory ranges, the starting addresses of which are stored in page table $208_1$. The page table maps the two virtual memory ranges to two physical memory ranges within physical memory $104_1$. Additional memory might be demanded by the process. Page table operations to satisfy the demand are given in the following figure. Specifically, FIG. 2B depicts page table memory mapping technique where the memory allocated from physical memory is not contiguous, yet the demand is satisfied by allocating a contiguously-located page table entry.

FIG. 2B exemplifies a page table memory mapping technique 2B00. As an option, one or more variations of page table memory mapping technique 2B00 or any aspect thereof may be implemented in the context of the architecture and functionality of the embodiments described herein. Also, the page table memory mapping technique 2B00 or any aspect thereof may be implemented in any environment.

The embodiment shown receives an allocation of new memory range $210_{1V}$ into virtual memory map $202_2$. The shown allocation of real memory (see new memory range $210_{1P}$) is not physically contiguous to any other physical memory allocation within physical memory $104_2$, yet the page table $208_2$ receives a new entry at page 2, which is contiguous to the page 1, and thus forms a virtually-contiguous range (e.g., see contiguous virtual addresses $206_1$). The foregoing depicts the situation where a demand for additional virtual memory can be satisfied by allocating a next (e.g., contiguous) page table entry. However, a next (e.g., contiguous) page table entry may not always be available (e.g., the next contiguous page table entry might be already in-use). The herein disclosed techniques facilitate high-performance pre-caching within various contiguous memory demand scenarios. One such contiguous memory demand scenario is shown and described as follows.

FIG. 2C depicts a non-contiguous memory demand scenario 2C00. The embodiment shown in FIG. 2C depicts an example where new virtual memory is demanded (e.g., some contiguous virtual addresses $206_2$ from within the address space of the virtual memory map $202_3$). The new memory range $210_{2V}$ is demanded by the process. The next available page table entry within page table $208_3$ is page 3. Allocation of physical memory (e.g., within physical memory $104_3$) for new memory range and allocation of the next page available of a page table entry would satisfy this non-contiguous memory demand scenario, however this does not produce the desired results of virtually-contiguous memory being allocated and delivered against a demand for contiguous virtual memory. Additional processing is needed to deliver virtually-contiguous memory against the demand. Such additional processing (e.g., a contiguous memory demand allocation technique) is shown and described as pertains to FIG. 2D.

Figure 2D:
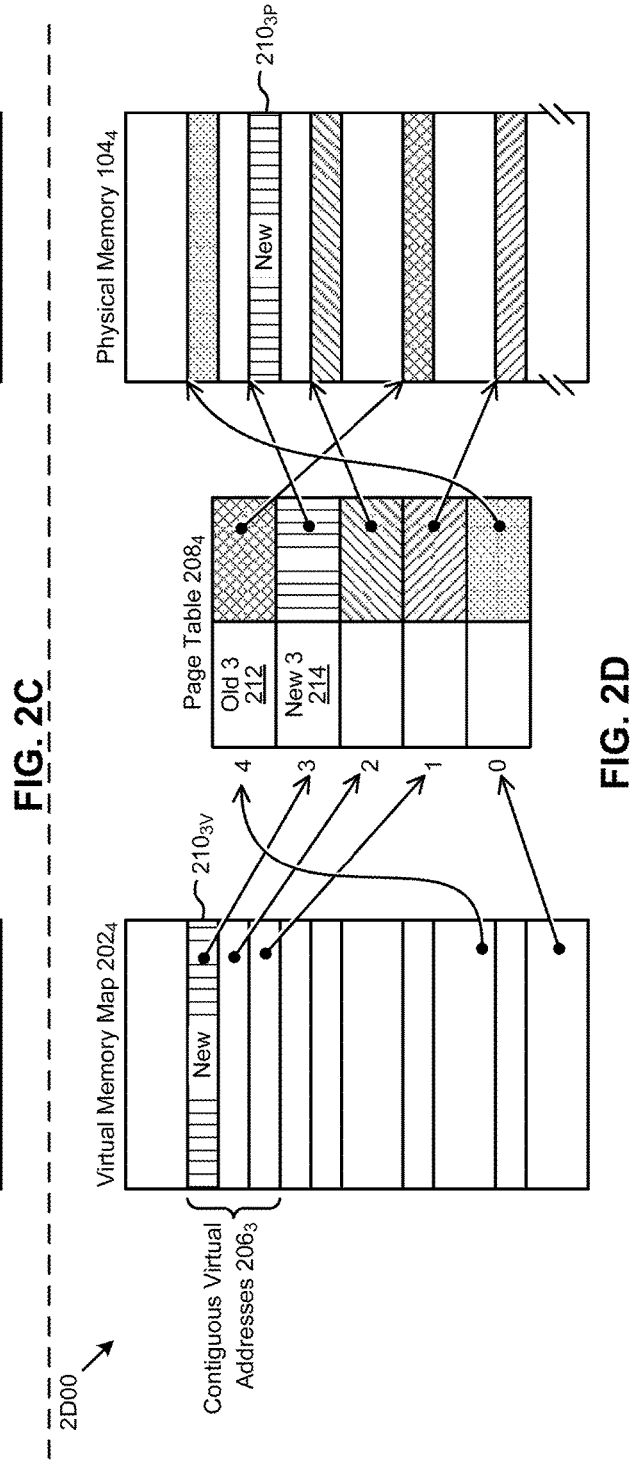
FIG. 2D depicts a contiguous memory demand allocation technique as used in systems that support concatenation of virtual memory pages to form virtually-contiguous memory ranges, according to an embodiment.

FIG. 2D depicts a contiguous memory demand allocation technique 2D00 as used in systems that support concatenation of virtual memory pages to form virtually-contiguous memory ranges. As an option, one or more variations of contiguous memory demand allocation technique 2D00 or any aspect thereof may be implemented in the context of the architecture and functionality of the embodiments described herein. Also, the contiguous memory demand allocation technique 2D00 or any aspect thereof may be implemented in any environment.

The embodiment shown in FIG. 2D is merely one example where a demand is to be fulfilled by allocation (e.g., contiguous virtual addresses $206_3$) of a virtually-contiguous address space (e.g., from within virtual memory map $202_4$). In this scenario, the application demands newly allocated physical memory (e.g., within physical memory $104_4$) that can be used to form contiguous virtual addresses (see contiguous virtual addresses $206_3$). Specifically, the application demands a third set of addresses (e.g., addresses of $210_{3V}$) that form the three-segment range of contiguous virtual addresses $206_3$. To accomplish such a range of contiguous virtual addresses $206_3$, the page table $208_4$ is adjusted. Specifically, in order for a set of contiguous page table entries to be formed, the contents of old page 3 212 page table entry is moved to page table entry for page 4, and page 3 214 is used since page 3 is contiguous with page 1 and page 2. The application's demand for a virtually-contiguous address space is satisfied, even though the allocated physical memory $210_{3P}$ is not contiguous.

Figure 3:
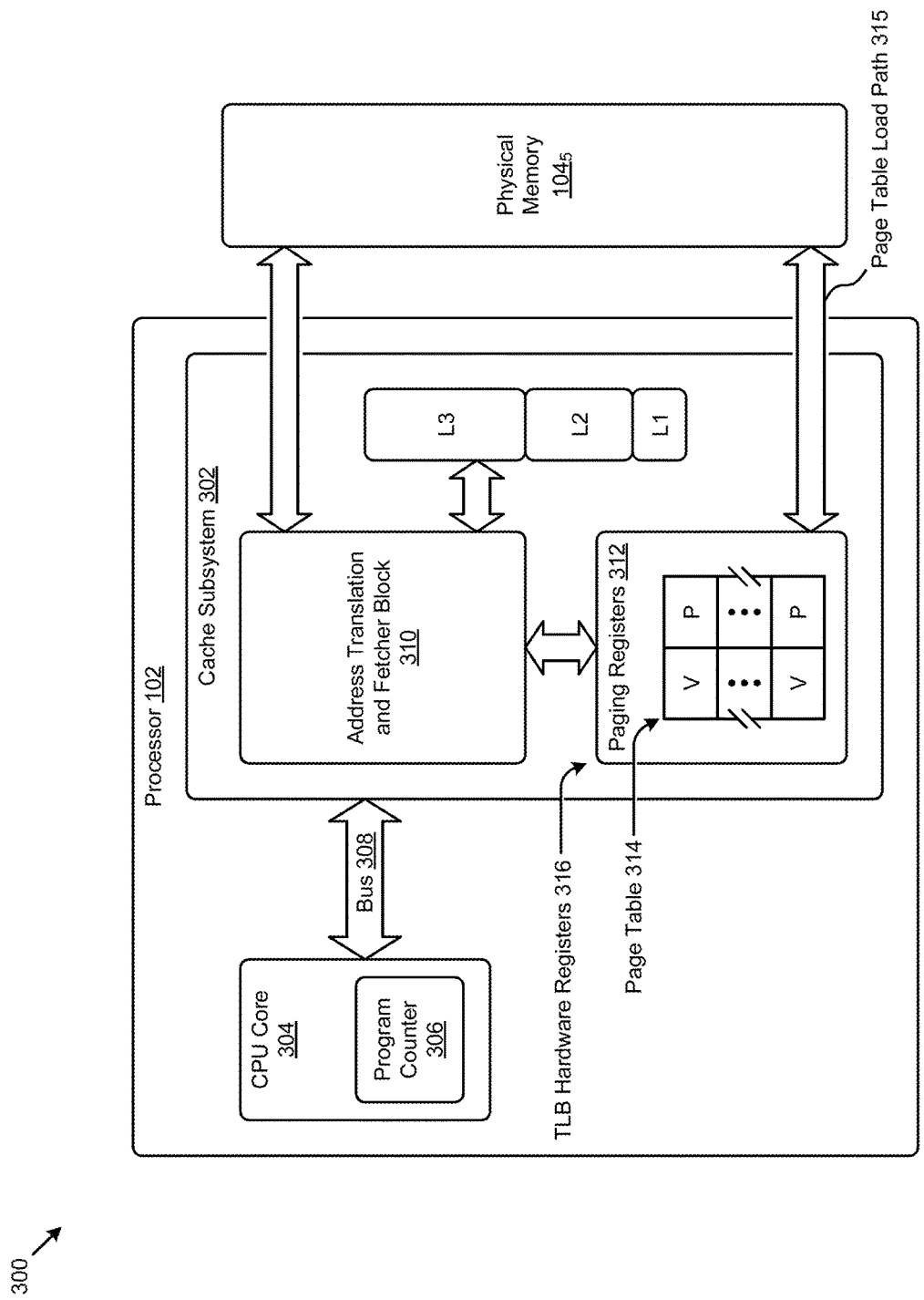
FIG. 3 depicts a processor with a cache subsystem suited for use with virtual memory pages that form virtually-contiguous memory ranges, according to an embodiment.

A page table such as is heretofore described can be used in the context of various cache subsystems, one example of which is discussed in FIG. 3.

FIG. 3 depicts a processor with a cache subsystem 300 suited for use with virtual memory pages that form virtually-contiguous memory ranges. As an option, one or more variations of cache subsystem 300 or any aspect thereof may be implemented in the context of the architecture and functionality of the embodiments described herein. Also, the cache subsystem 300 or any aspect thereof may be implemented in any environment.

The processor 102 is composed of a CPU core 304 and a cache subsystem 302. The CPU core comprises a program counter 306, and the cache subsystem 302 comprises an address translation and fetcher block (see fetcher 310). The address translation and fetcher block is interfaced with paging registers 312, physical memory $104_5$, and several levels of cache (e.g., L1, L2, and L3). Further, a bus 308 provides an interface between the CPU core and the cache subsystem. When a virtual address is needed by the CPU, the virtual address is placed on bus 308. The address might be a HIT or might be a MISS. In the case that the address is a MISS, then the fetcher 310 will use a TLB to determine if the virtual address is captured in a tag within the page table and, if so, the fetcher will access the corresponding physical memory. When the fetcher is configured such that the fetcher prefetches data based on virtual addresses, then the prefetcher will fetch data from physical memory from the physical addresses that correspond to the physical addresses given in the next contiguous page table entry within page table 314.

The paging registers 312 can be loaded, unloaded and otherwise managed under software control. More specifically, and as discussed in the following discussions pertaining to FIG. 4, an operating system (e.g., a kernel within an operating system) can access the paging registers through a page table load path 315. Such a path can be accessed by an operating system kernel. Commands (e.g., system calls) can be made from an application (e.g., process P1) to manipulate any number of sets of virtual-to-physical page table mappings. In an operating system that supports multiple processes (e.g., Linux) each process can have a private set of virtual-to-physical page table mappings. Moreover, a given process can manipulate the contents of its own private set of virtual-to-physical page table mappings. A process can make a system call which in turn can access data structures in the operating system space. Strictly as one example, a process running in a Linux environment can make calls to "mmap( )", "memset( )", and "mremap( )" to perform reads and modifications to data structures in the Linux the operating system space. Interactions between an operating system and a cache subsystem are shown and discussed as pertains to FIG. 4.

Figure 4:
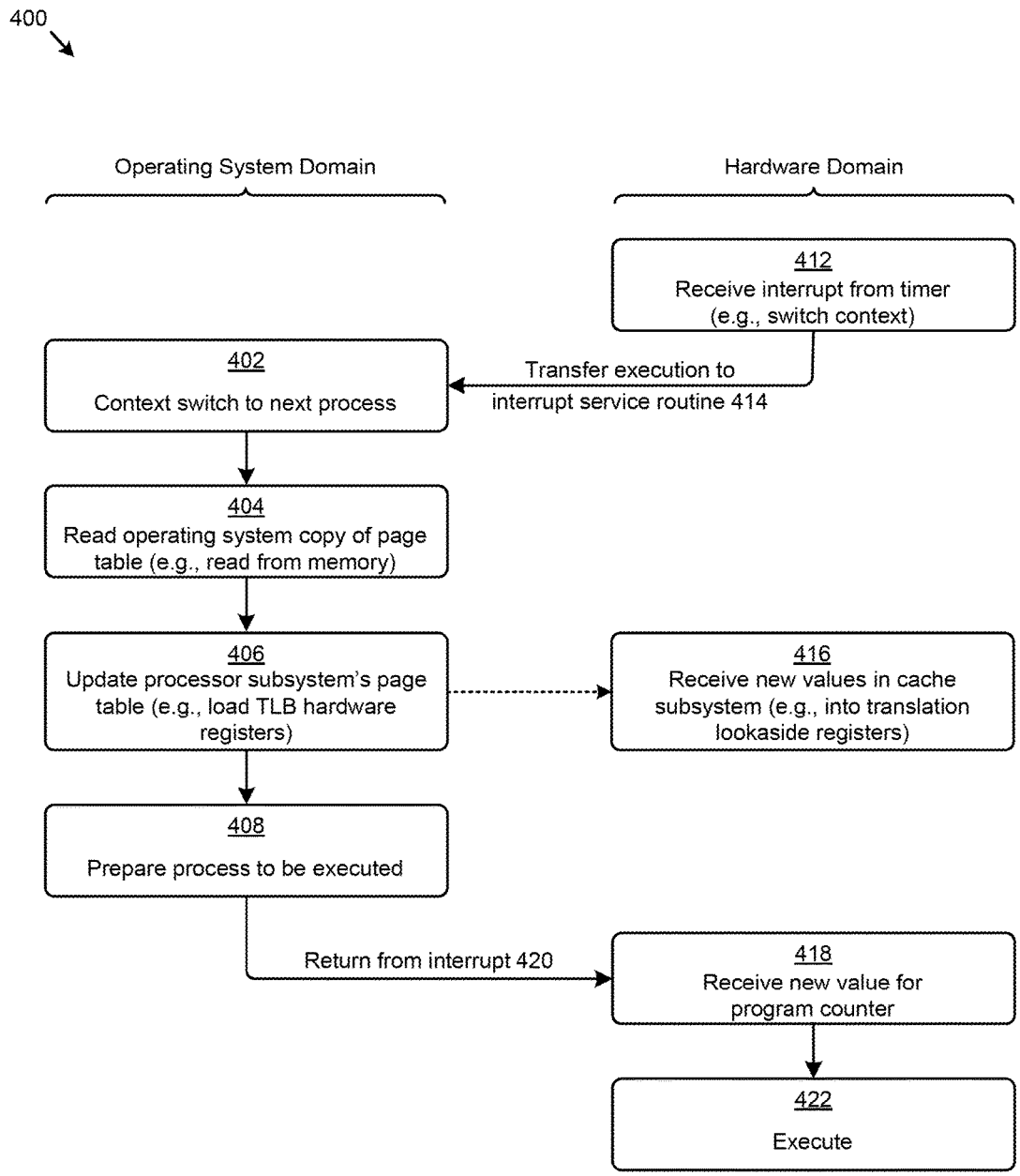
FIG. 4 depicts a set of interactions between an operating system domain and a hardware domain to implement concatenation of virtual memory pages to form virtually-contiguous memory ranges, according to an embodiment.

FIG. 4 depicts a set of interactions 400 between an operating system domain and a hardware domain to implement concatenation of virtual memory pages to form virtually-contiguous memory ranges. As an option, one or more variations of interactions 400 or any aspect thereof may be implemented in the context of the architecture and functionality of the embodiments described herein. Also, the interactions 400 or any aspect thereof may be implemented in any environment.

The shown interactions between a hardware domain and an operating system domain commence when a processor receives a hardware interrupt such as a timer interrupt (see step 412). The hardwired or microcoded response to such an interrupt is to load the program counter with the address of the preconfigured interrupt service routine. Doing so results in processor execution of the first instruction of the interrupt service routine. In exemplary embodiments, an interrupt service routine can be just a few instructions, or the interrupt service routine can include further transfer of control, possibly to an interrupt handler of arbitrary complexity. In any of these cases, the occurrence of the interrupt transfers execution to the interrupt service routine (see operation 414). In this example involving a multi-process operating system, the interrupt service routine includes initiating operating system processing so as to perform a context switch to a next process (see step 402). The operating system performs various scheduling and bookkeeping tasks, one of which can include accessing the private page table of the next-to-be-executed process (see step 404). The operating system can then load the page table 314 with the contents of the private page table of the next-to-be-executed process (see step 406).

The hardware receives the new values (see operation 416) and, in doing so, establishes the virtual address space of the next-to-be-executed process. More specifically, doing so establishes the virtual paging registers that are used to describe the virtual address space and corresponding physical addresses as are used during execution of the next-to-be-executed process. After the paging registers have been loaded, the operating system performs other steps (e.g., restoring process variables, hardware register values, etc.) before initiating transfer of control to the next-to-be-executed process (see step 408). Strictly as one example, some processors implement a return-from-interrupt instruction that is interpreted by the processor to mean (1) leave the interrupt state, and (2) load the processor's program counter with a new value such as the next instruction location of the next-to-be-executed process. Performance by the processor of such a return-from-interrupt or similar instruction (e.g., operation 420) has the effect of receiving a next instruction address for the program counter (see operation 418), which would then cause returning to execution of the next-to-be-executed process (e.g., see step 422).

The address space of the next-to-be-executed process is defined by its virtual address space, which in turn is defined by its series of paging registers, the value for which are now loaded into the processor's paging registers. When the next-to-be-executed process executes, it might need to access data at some particular address. Depending on the then-current contents of the cache (e.g., L1, L2, L3), the address might be a HIT or might be a MISS. In the case that the address is a MISS, then the fetcher 310 will use the TLB hardware registers 316 to determine if the virtual address is captured in a tag within the page table and, if so, the fetcher will access the corresponding physical memory. When the fetcher is configured such that the fetcher prefetches data based on virtual addresses, then the prefetcher will fetch data from physical memory from the physical addresses that correspond to the physical addresses given in the next contiguous page table entry within the page table 314.

When the page table 314 has been manipulated so as to present contiguous virtual address space in contiguous paging registers, then the act of prefetching data from physical memory that corresponds to the physical addresses given in the next contiguous page table entry within the page table 314 serves to retrieve content (e.g., into cache), which retrieved content is deemed (e.g., by the prefetch philosophy) to be likely-to-be-used by the process (e.g., since the retrieved content is virtually contiguous).

Various processor implementations can include one or more central processing units (CPUs) or cores, and various processor implementations can include caching subsystems of varying capabilities. As earlier indicated (see FIG. 1) some caching subsystems perform prefetch operations based on the next contiguous physical addresses, while other caching subsystems perform prefetch operations based on the next contiguous page table entry. Details of operations in this latter case are shown and described as pertains to the following FIG. 5.

Figure 5:
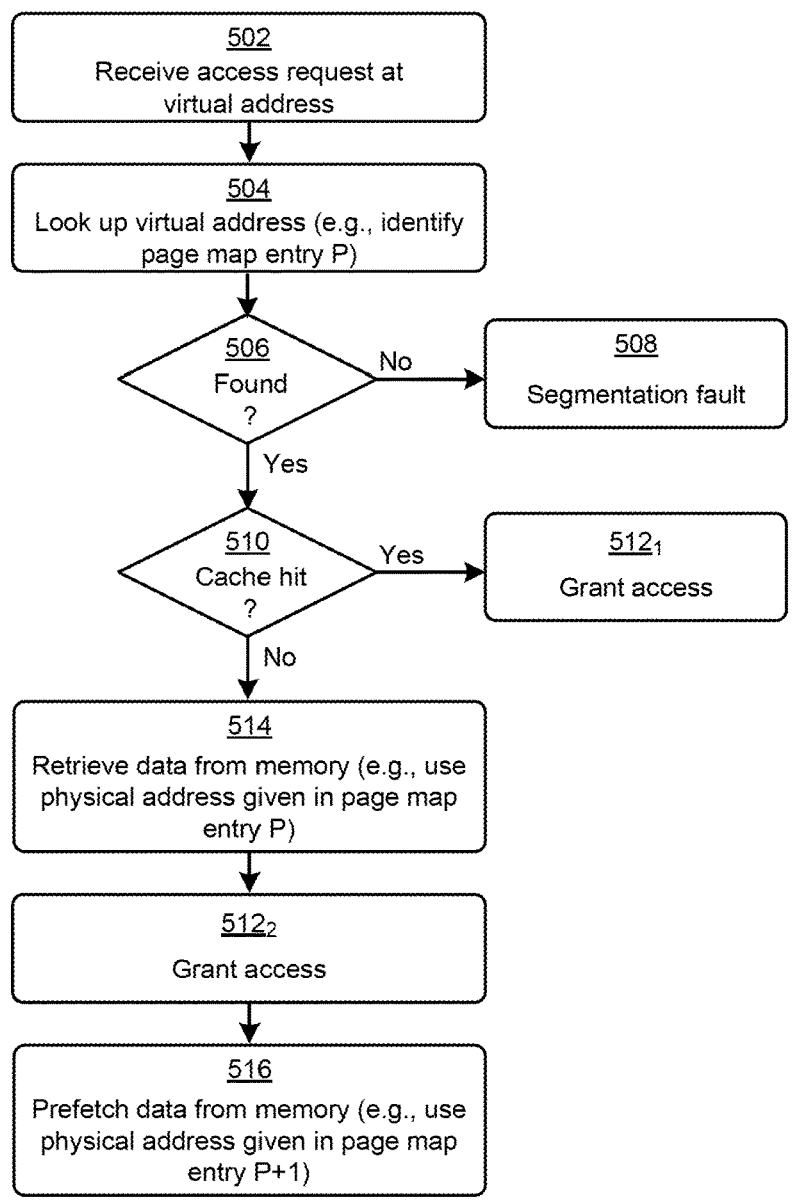
FIG. 5 presents a processor caching subsystem operation flow to use concatenated virtual memory pages that form virtually-contiguous memory ranges, according to an embodiment.

FIG. 5 presents a processor caching subsystem operation flow 500 to use concatenated virtual memory pages that form virtually-contiguous memory ranges. As an option, one or more variations of processor caching subsystem operation flow 500 or any aspect thereof may be implemented in the context of the architecture and functionality of the embodiments described herein. Also, the processor caching subsystem operation flow 500 or any aspect thereof may be implemented in any environment.

In the course of executing a process (e.g., the aforementioned execution of the next-to-be-executed process as in step 422), the processor will decode instructions, some of which instructions may include a request (e.g., by appearance of an operand in an instruction) for memory access at some virtual address (see step 502). In systems that include a caching subsystem with paging registers, the caching subsystem (e.g., possibly using a translation lookaside buffer) will look-up the requested virtual address so as to determine if the requested virtual address is within the virtual address space of the requestor (see step 504). If the virtual address is not within the virtual address space of the requestor (see decision 506), a segmentation fault is raised (see step 508); else, the cache contents are consulted to determine if the requested virtual address is a cache HIT or MISS. In the case of a cache HIT (see the "Yes" branch of decision 510), then access is granted and the contents are retrieved from cache to satisfy the request (see step 512₁). If the case of a cache MISS (see the "No" branch of decision 510), then physical memory is accessed at the physical addresses that are given in the page table entry that corresponds to the requested virtual address (see step 514). The contents retrieved are brought into cache, and access is granted to the requestor (see step 512₂). In the case of a virtual prefetch cache implementation, additional contents are accessed from the physical memory range that corresponds to the next contiguous paging register (see step 516).

The size (e.g., address range) of the physical memory range that corresponds to the next contiguous paging register, and the size of the virtual address ranges described in the paging registers, are implementation-specific. In some cases the physical memory range that corresponds to the next contiguous paging register is relatively smaller. In some cases the physical memory range that corresponds to the next contiguous paging register is relatively larger. The size of the memory range that is prefetched is similarly implementation-specific. In some cases, a paging register refers to an address range that is relatively smaller, or can refer to a range that is relatively larger. One such example is given in the following figures.

FIG. 6A and FIG. 6B present a sequence of data structure values as used in systems that implement concatenation of virtual memory pages to form virtually-contiguous memory ranges. As an option, one or more variations of sequence or any aspect thereof may be implemented in the context of the architecture and functionality of the embodiments described herein. Also, the sequence or any aspect thereof may be implemented in any environment.

The embodiment shown in FIG. 6A depicts initial data structure values 6A00. In the shown example, the data structures (e.g., Data1 and DataN) are both 4 k words in size. If the data structure Data1 was allocated before the allocation of DataN, the virtual address space might be described using a "0" paging register (e.g., for data1) and a "1" paging register (e.g., for DataN). In such an allocation, the paging register "1" is contiguous to the paging register "0", however this allocation exemplifies the situation where, if the process needs to allocate additional space to accommodate expansion of the data1 data structure, then the paging registers in the shown virtual address space would need to be manipulated to accommodate contiguous paging registers so as to avail of prefetch operations by the caching subsystem. Such a manipulation of a paging register is presented in FIG. 4B.

The embodiment shown in FIG. 6B depicts expansion of data structure values 6B00. Specifically, the 4 k data structure data1 is to be expanded to add an additional 8 k, and this 8 k is to be situated in virtual address space that is contiguous to the 4 k data structure data1; and furthermore, this 8 k is to be referred to in a paging register that is contiguous to the paging register of the 4 k data structure data1. To accomplish this, the paging registers are manipulated so as to produce the layout and mapping as shown in the data structure values 6B00.

Strictly as one example, and referring to FIG. 6A, data structure values (e.g., virtual address space page table entries) can be manipulated as follows:

identifying a first virtual memory space that has a corresponding first physical memory address (e.g., entry "0"), determining an occurrence of a base page table entry that corresponds to the first virtual memory space (e.g., entry "0"), determining an occurrence of a next higher base page table entry that corresponds to another virtual memory space (e.g., entry "1");

responsive to determining the occurrence of a next higher base page table entry that corresponds to another virtual memory space, moving at least a portion of contents of the next higher base page table entry to another location (e.g., in this case, entry "0" and entry "1" are swapped), leaving an open entry in the yet next base page table entry (e.g., entry "2"), which yet next base page table entry (e.g., entry "2") can be used to correspond to a virtual memory space that is contiguous to the first virtual memory space (as shown).

Other techniques as herein-disclosed perform acts of storing a newly-allocated physical memory address in the next higher base page table entry by moving at least a portion of contents of the next higher base page table entry to another location, so as to leave open a next base page table entry.

The paging register manipulation as described heretofore serves to produce contiguous virtual address spaces as are availed by a process for access to its data structure; and furthermore, the contiguous virtual address spaces that are availed by the process are described in contiguous paging registers so as to take advantage of prefetching operations of the cache subsystem. In some environments, paging register manipulation can be accomplished directly by an operating system facility (e.g., in memory allocator code that runs with sufficient privileges). In other situations, a lesser-privileged process or thread can effect paging register manipulation using system calls. One such example of paging register manipulation using system calls is given in the following figure.

Figure 7:
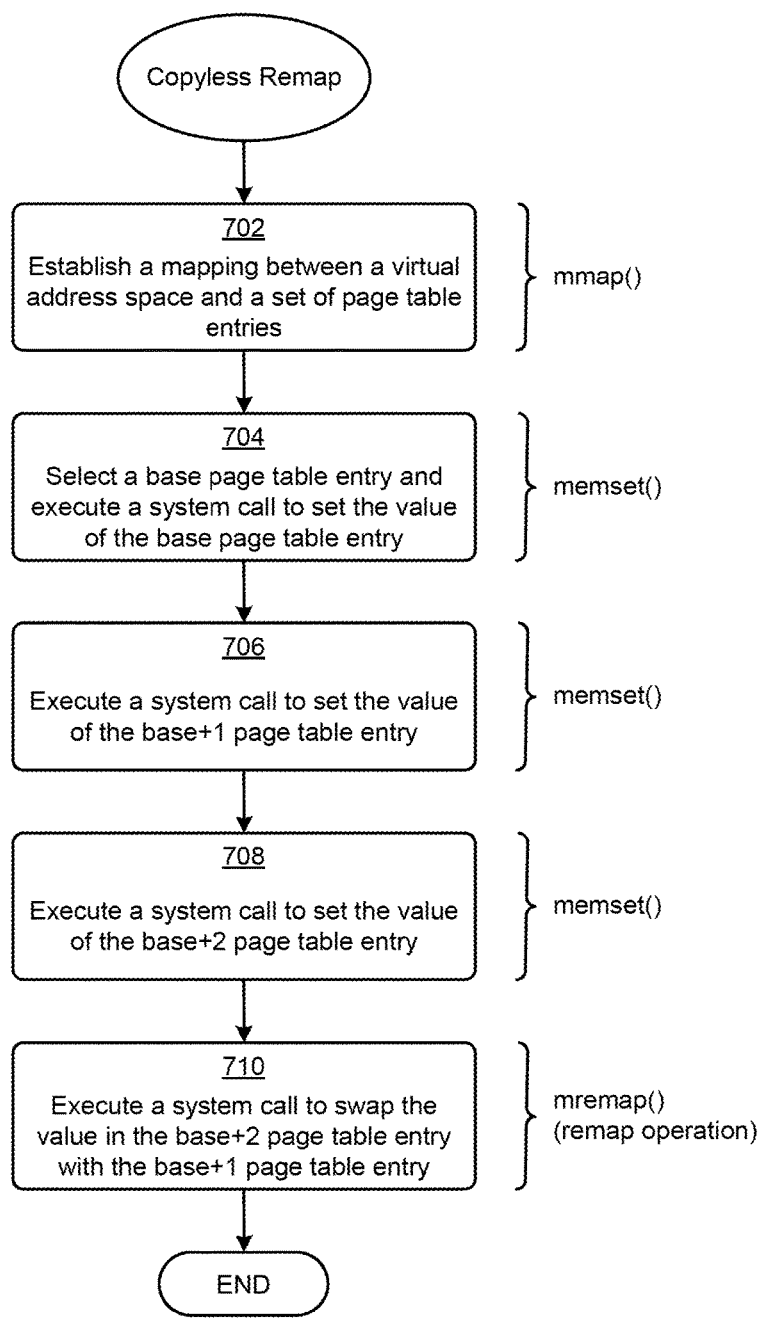
FIG. 7 presents a sample copyless remapping of page table entries to demonstrate concatenation of virtual memory page table entries to form virtually-contiguous memory ranges, according to an embodiment.

FIG. 7 presents a sample copyless remapping of page table entries to demonstrate concatenation of virtual memory page entries to form virtually-contiguous memory ranges.

The embodiment shown in FIG. 7 is merely one example. The example shown is presented as a 'C' language "copylessRemap( )" entry point, however variations can be implemented such that a process can call a different entry point, possibly using a 'C' function call, or an assembly language entry point. The depicted sample uses a system call "mmap( )" to establish a mapping between a virtual address and a set of page table entries (see operation 702). In this sample, three contiguous page table entries (e.g., zeroeth page table entry, zero+1th, and zero+2 page table entries) receive three different address values (see operation 704, operation 706, and operation 708). Strictly as a demonstration example of this copyless remap technique, the values in the zero+1th, and zero+2 page table entries are swapped (see "mremap( )" remap of operation 710). This establishes the zero+1th, and the zero+2 page table entries as pointing to logically contiguous memory areas. The page table entries (e.g., their values) are used by the operating system in loading page table registers as a group. Prefetchers that perform prefetching of memory contents based on the memory value found at the memory location pointed to by a next higher contiguous page table register will fetch the logically contiguous memory contents as was established in the copyless remap of operation 710.

Additional Embodiments of the Disclosure

Additional Practical Application Examples

Figure 8A:
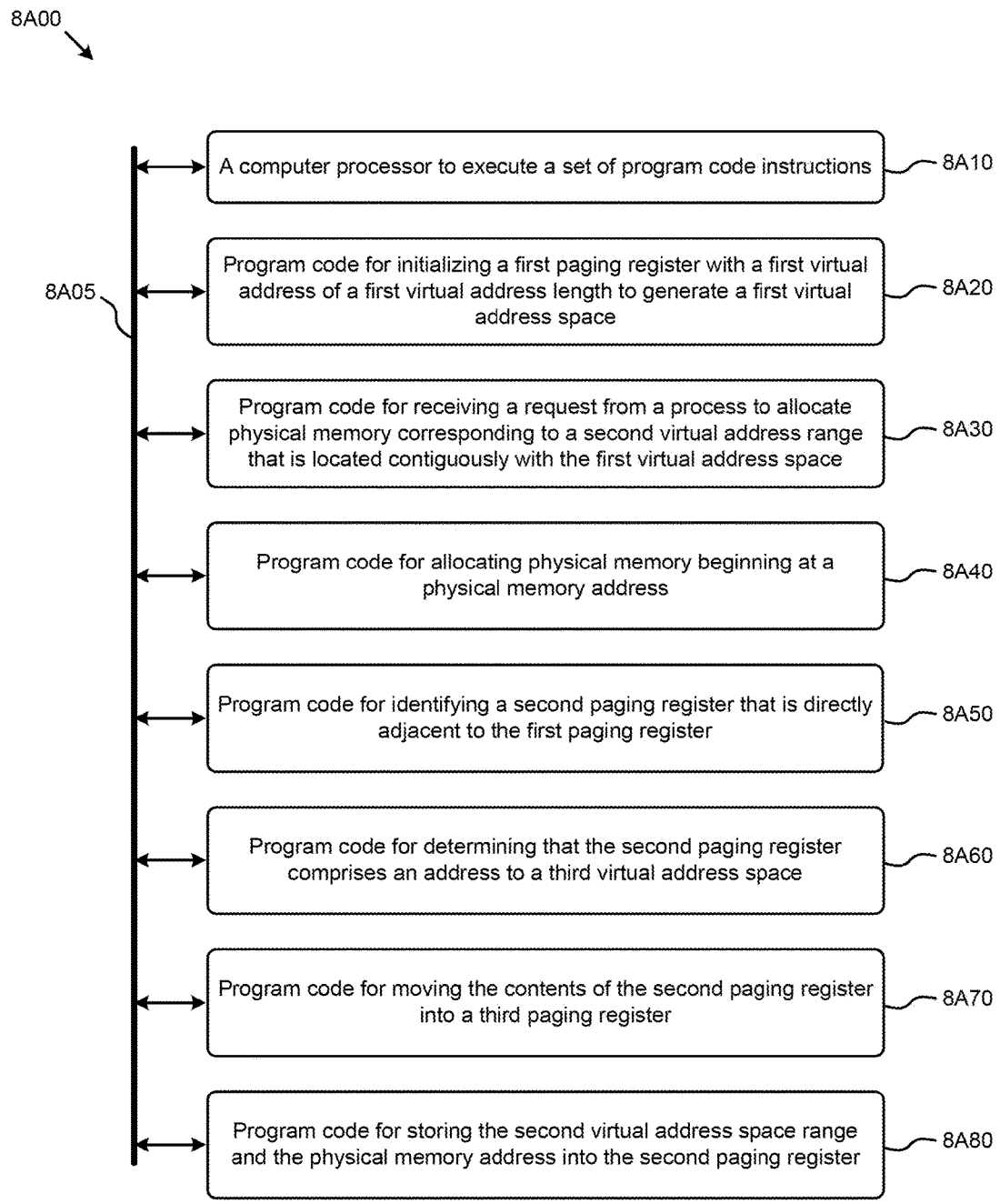
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. The partitioning of system 8A00 is merely illustrative and other partitions are possible. FIG. 8A depicts a block diagram of a system to perform certain functions of a computer system. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising a computer processor to execute a set of program code instructions (see module 8A10) and modules for accessing memory to hold program code instructions to perform: initializing a first paging register with a first virtual address of a first virtual address length to generate a first virtual address space (see module 8A20); receiving a request from a process to allocate physical memory corresponding to a second virtual address range that is located contiguously with the first virtual address space (see module 8A30); allocating physical memory beginning at a physical memory address (see module 8A40); identifying a second paging register that is directly adjacent to the first paging register (see module 8A50); determining that the second paging register comprises an address to a third virtual address space (see module 8A60); moving the contents of the second paging register into a third paging register (see module 8A70); and storing the second virtual address space range and the physical memory address into the second paging register (see module 8A80).

Figure 8B:
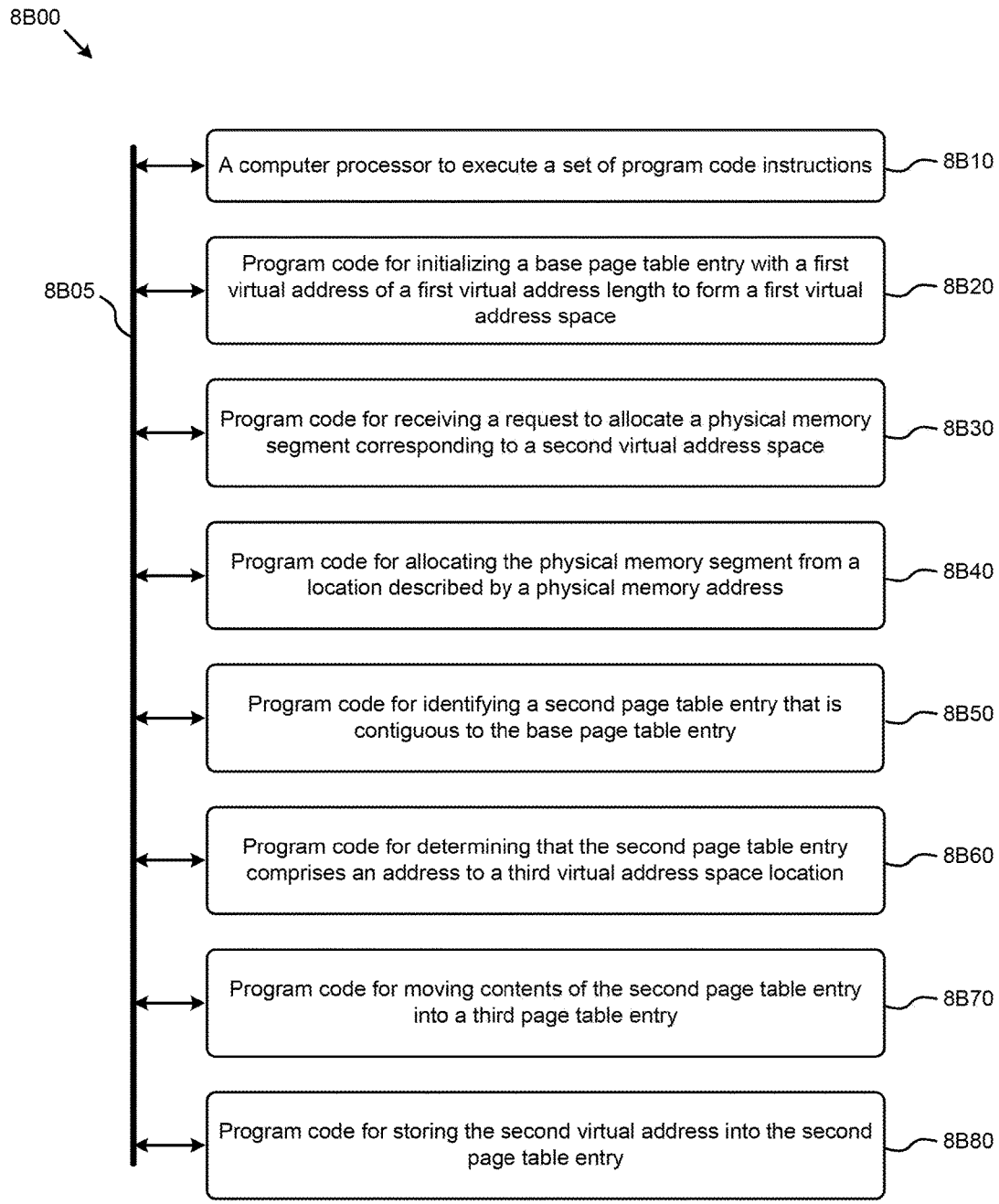

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising a computer processor to execute a set of program code instructions (see module 8B10) and modules for accessing memory to hold program code instructions to perform: initializing a first paging register with a first virtual address of a first virtual address length to form a first virtual address space (see module 8B20); receiving a request from a process to allocate a physical memory segment corresponding to a second virtual address space (see module 8B30); allocating the physical memory segment from a location described by a physical memory address (see module 8B40); identifying a second paging register that is contiguous to the first paging register (see module 8B50); determining that the second paging register comprises an address to a third virtual address space location (see module 8B60); moving contents of the second paging register into a third paging register (see module 8B70); and storing the second virtual address into the second paging register (see module 8B80).

System Architecture Overview

Additional System Architecture Examples

Figure 9A:
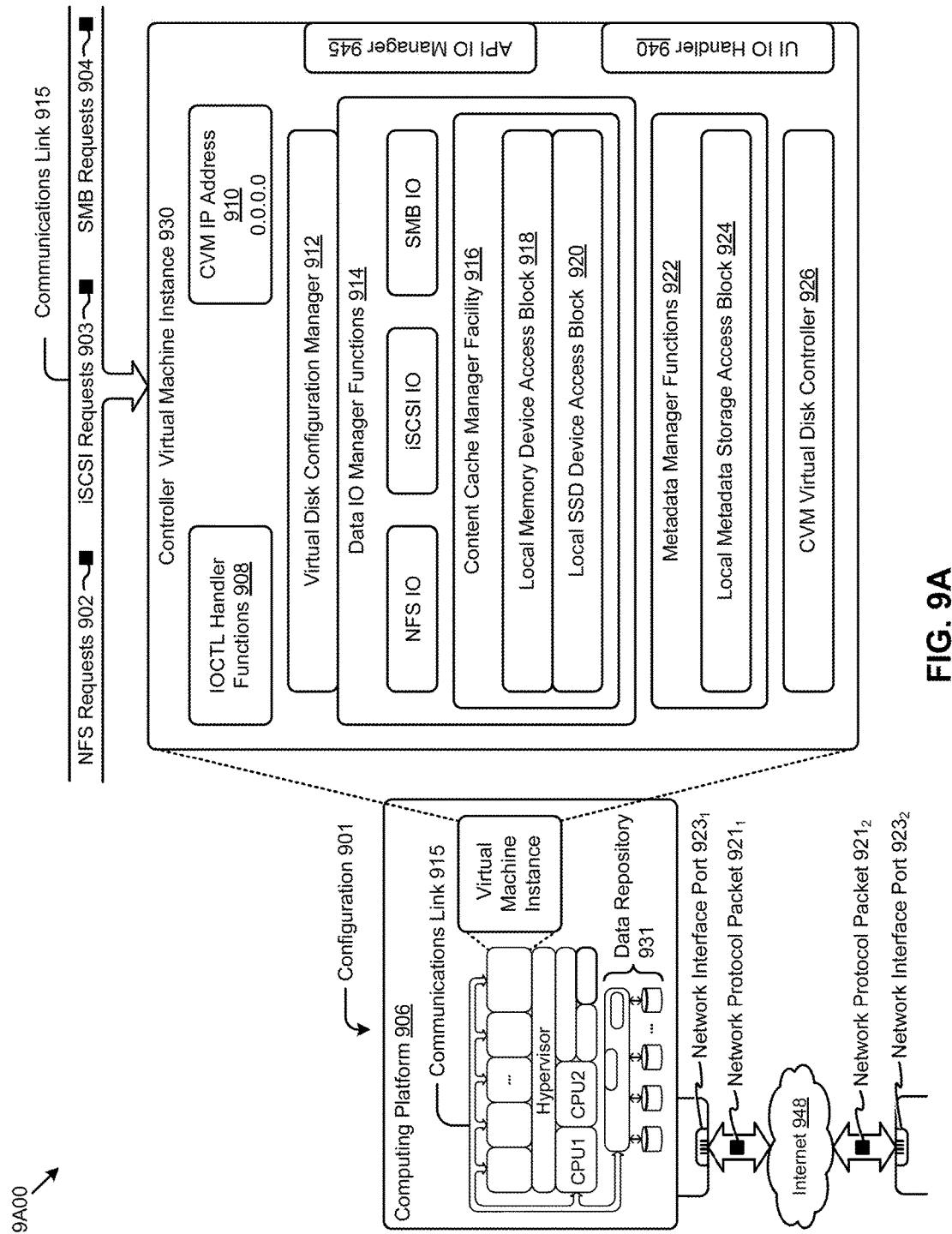
FIG. 9A and FIG. 9B depict architectures comprising collections of interconnected components suitable for implementing embodiments of the present disclosure and/or for use in the herein-described environments.

FIG. 9A depicts a virtual machine architecture 9A00 comprising a collection of interconnected components suitable for implementing embodiments of the present disclosure and/or for use in the herein-described environments. The shown virtual machine architecture 9A00 includes a virtual machine instance in a configuration 901 that is further described as pertaining to the controller virtual machine instance 930. A controller virtual machine instance receives block IO storage requests as of network file system (NFS) requests in the form of NFS requests 902, and/or internet small computer storage interface (iSCSI) block IO requests in the form of iSCSI requests 903, and/or Samba file system requests (SMB) in the form of SMB requests 904. The controller virtual machine instance publishes and responds to an internet protocol (IP) address (e.g., see CVM IP address 910. Various forms of input and output (TO) can be handled by one or more IO control handler IOCTL handler functions 908 that interface to other functions such as data IO manager functions 914, metadata manager functions 922. As shown, the data IO manager functions can include communication with a virtual disk configuration manager 912, and/or can include direct or indirect communication with any of various block IO functions (e.g., NFS TO, iSCSI TO, SMB TO, etc.).

In addition to block IO functions, the configuration 901 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through the shown API IO manager 945.

The communications link 915 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid-state storage devices (SSD), or optical or magnetic disks such as disk drives or tape drives. Volatile media includes dynamic memory such as a random access memory. As shown, the controller virtual machine instance 930 includes a content cache manager facility 916 that accesses storage locations, possibly including local DRAM (e.g., through the local memory device access block 918) and/or possibly including accesses to local solid state storage (e.g., through local SSD device access block 920).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). An external data repository 931, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 924. The external data repository 931, can be configured using a CVM virtual disk controller 926, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 901 can be coupled by a communications link 915 (e.g., backplane, LAN, PTSN, wired or wireless network, etc.) and each instance may perform respective portions of sequences of instructions as may be required to practice embodiments of the disclosure The shown computing platform 906 is interconnected to the Internet 948 through one or more network interface ports (e.g., network interface port $923_1$ and network interface port $923_2$). The configuration 901 can be addressed through one or more network interface ports using an IP address. Any operational element within computing platform 906 can perform sending and receiving operations using any of a range of network protocols, possibly including network protocols that send and receive packets (e.g., see network protocol packet $921_1$ and $921_2$).

The computing platform 906 may transmit and receive messages that can be composed of configuration data, and/or any other forms of data and/or instructions organized into a data structure (e.g., communications packets). In some cases, the data structure includes program code instructions (e.g., application code), communicated through Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or results of executing program code can be delivered to a particular user via a download (e.g., a download from the computing platform 906 over the Internet 948 to an access device).

The configuration 901 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to concatenation of virtual memory pages to form virtually-contiguous memory ranges.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of concatenation of virtual memory pages to form virtually-contiguous memory ranges). Such files or records can be brought into and/or stored in volatile or non-volatile memory.

Figure 9B:
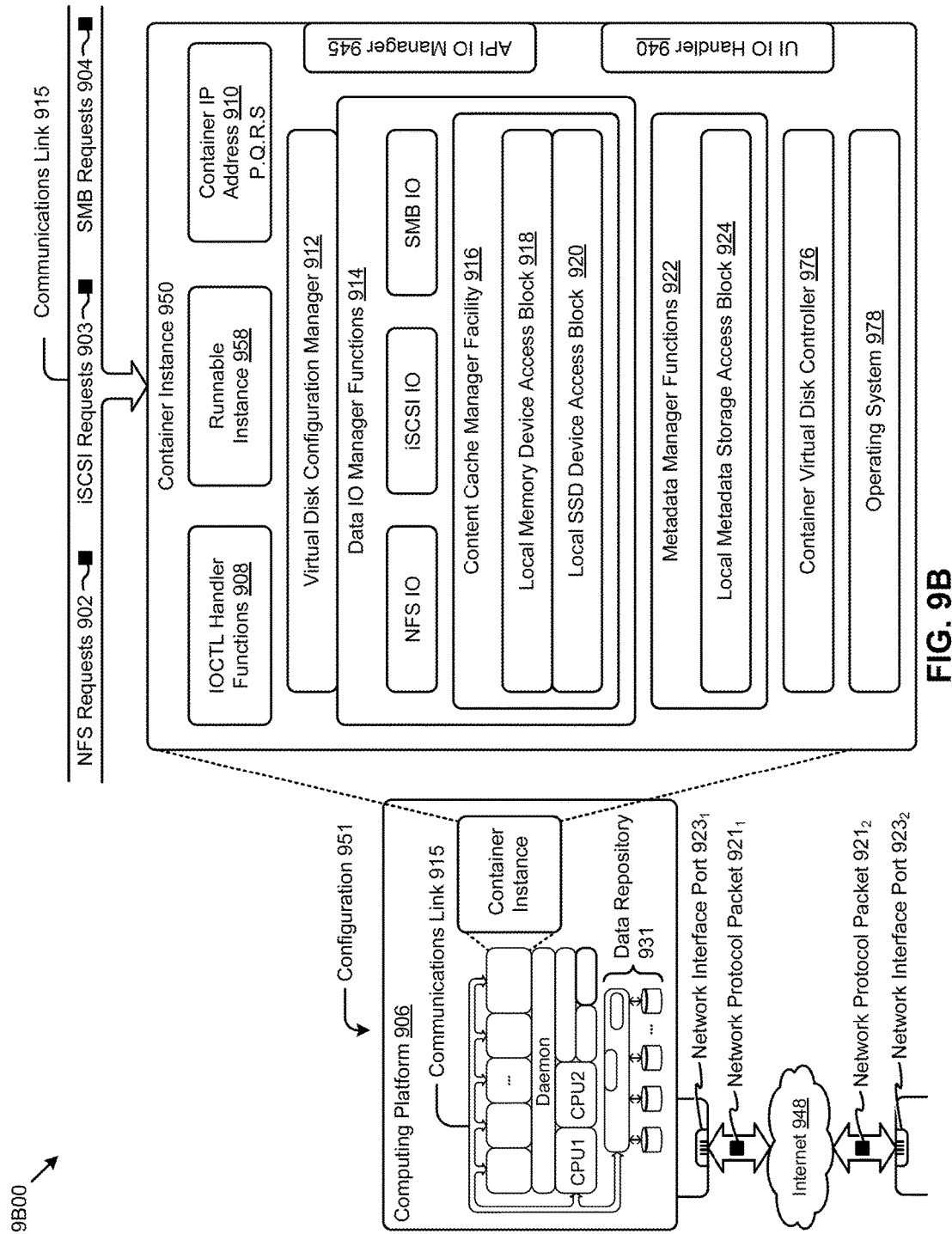

FIG. 9B depicts a containerized architecture 9B00 comprising a collection of interconnected components suitable for implementing embodiments of the present disclosure and/or for use in the herein-described environments. The shown containerized architecture 9B00 includes a container instance in a configuration 951 that is further described as pertaining to the container instance 950. The configuration 951 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls -a", etc.). The container might optionally include an operating system 978, however such an operating system need not be provided. Instead, a container can include a runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 976. Such a container virtual disk controller can perform any of the functions that the aforementioned CVM virtual disk controller 926, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method for performing virtual paging register remap operations to manipulate a set of two or more contiguous paging registers to map them onto contiguous virtual addresses of virtual address spaces, the method comprising:

maintaining a paging register structure of a cache management system, the paging register structure having a set of paging, each paging register in the set of paging registers comprising a first portion and a second portion, the first portion of at least one of the paging registers in the paging register structure holding a virtual address for a virtual memory, the second portion of the at least one of the paging registers holding a physical address for a physical memory for the virtual address stored in the first portion of the same paging register, the paging registers of the set of paging registers being arranged contiguously within the paging register structure such that the set of paging registers form a sequence of paging registers, wherein entries in the paging registers are arranged based upon an increasing or decreasing order of virtual addresses in corresponding first portions of the paging registers;

managing paging table data using the paging register structure to map virtual addresses to physical addresses for a virtual address space, at least by:

initializing a first paging register of the set of paging registers by writing a first virtual address in the first portion of the first paging register and a first physical address of a first physical memory segment in the second portion of the first paging register, the first paging register associating the first virtual address with the first physical memory segment of the virtual address space;

receiving a request to allocate a second physical memory segment to a second virtual address, the second physical memory segment corresponding to a second physical address;

determining that the second virtual address corresponds to the virtual address space and is contiguous with the first virtual address stored in the first portion of the first paging;

allocating the second physical memory segment by:

identifying a second paging register that is contiguous to the first paging register;

determining that the first portion of the second paging register is populated with a third virtual address that is non-contiguous with the first virtual address in the first portion of the first paging register;

moving contents of the second paging register into a third paging register by writing the third virtual address stored in the first portion of the second paging register to the first portion of the third paging register and by writing a third physical memory address in the second portion of the second paging register to the second portion of the third paging register; and storing the second virtual address into the second paging register by writing the second virtual address in the first portion of the second paging register and the second physical address in the second portion of the second paging register; and receiving a memory access request to the first virtual address stored in the first portion of the first paging register;

servicing the memory access request by at least accessing the first physical memory address stored in the second portion of the first paging register; and prefetching data at the second physical memory segment using the second physical address stored in the second portion of the second paging register as a result of receiving the memory access request to the first virtual address.

2. The method of claim 1, wherein the first physical memory segment and the second physical memory segment are non-contiguous.

3. The method of claim 1, wherein the third paging register is not contiguous with the first paging register.

4. The method of claim 1, wherein the first paging register and the second paging register are organized in adjacent slots in a page table.

5. The method of claim 4, wherein starting addresses of memory ranges are stored in the page table.

6. The method of claim 4, wherein page table maps a virtual memory range to a respective physical memory range within physical memory.

7. The method of claim 1, further comprising a look-up of the virtual address space to determine if the virtual address space is within a set of virtual address space boundaries of an operating system process.

8. A computer program product embodied in a non-transitory computer readable medium, the non-transitory computer readable medium having stored thereon a sequence of instructions which, when stored in memory and executed by a processor causes the processor to perform a set of acts for performing virtual paging register remap operations to manipulate a set of two or more contiguous paging registers to map them onto contiguous addresses of virtual address spaces, the set of acts comprising:

maintaining a paging register structure of a cache management system, the paging register structure having a set of paging, each paging register in the set of paging registers comprising a first portion and a second portion, the first portion of at least one of the paging registers in the paging register structure holding a virtual address for a virtual memory, the second portion of the at least one of the paging registers holding a physical address for a physical memory for the virtual address stored in the first portion of the same paging register, the paging registers of the set of paging registers being arranged contiguously within the paging register structure such that the set of paging registers form a sequence of paging registers, and wherein entries in the paging registers are arranged based upon an increasing or decreasing order of virtual addresses in corresponding first portions of the paging registers;

managing paging table data using the paging register structure to map virtual addresses to physical addresses for a virtual address space, at least by:

initializing a first paging register of the set of paging registers by writing a first virtual address in the first portion of the first paging register and a first physical address of a first physical memory segment in the second portion of the first paging register, the first paging register associating the first virtual address with the first physical memory segment of the virtual address space;

receiving a request to allocate a second physical memory segment to a second virtual address, the second physical memory segment corresponding to a second physical address;

determining that the second virtual address corresponds to the virtual address space and is contiguous with the first virtual address stored in the first portion of the first paging register;

allocating the second physical memory segment by:
  identifying a second paging register that is contiguous to the first paging register;
  determining that the first portion of the second paging register is populated with a third virtual address that is non-contiguous with the first virtual address in the first portion of the first paging register;
  moving contents of the second paging register into a third paging register by writing the third virtual address stored in the first portion of the second paging register to the first portion of the third paging register and by writing a third physical memory address in the second portion of the second paging register to the second portion of the third paging register; and
  storing the second virtual address into the second paging register by writing the second virtual address in the first portion of the second paging register and the second physical address in the second portion of the second paging register; and receiving a memory access request to the first virtual address stored in the first portion of the first paging register;

servicing the memory access request by at least accessing the first physical memory address stored in the second portion of the first paging register; and prefetching data at the second physical memory segment using the second physical address stored in the second portion of the second paging register as a result of receiving the memory access request to the first virtual address.

9. The computer program product of claim 8, wherein the first physical memory segment and the second physical memory segment are non-contiguous.

10. The computer program product of claim 8, wherein the third paging register is not contiguous with the first paging register.

11. The computer program product of claim 8, wherein the first paging register and the second paging register are organized in adjacent slots in a page table.

12. The computer program product of claim 11 wherein starting addresses of memory ranges are stored in the page table.

13. The computer program product of claim 11, wherein page table maps a virtual memory range to a respective physical memory range within physical memory.

14. The computer program product of claim 8, further comprising a look-up of the virtual address space to determine if the virtual address space is within a set of virtual address space boundaries of an operating system process.

15. A system that performs virtual paging register remap operations to manipulate a set of two or more contiguous paging registers to map them onto contiguous addresses of virtual address spaces, the system comprising:
  a storage medium having stored thereon a sequence of instructions; and
  a processor or processors that execute the sequence of instructions to cause the processor or processors to perform a set of acts, the set of acts comprising,
    maintaining a paging register structure of a cache management system, the paging register structure having a set of paging registers, each paging register in the set of paging registers comprising a first portion and a second portion, the first portion of at least one of the paging registers in the paging register structure holding a virtual address for a virtual memory, the second portion of the at least one of the paging registers holding a physical address for a physical memory for the virtual address stored in the first portion of the same paging register, the paging registers of the set of paging registers being arranged contiguously within the paging register structure such that the set of paging registers form a sequence of paging registers, and wherein entries in the paging registers are arranged based upon an increasing or decreasing order of virtual addresses in corresponding first portions of the paging registers;
    managing paging table data using the paging register structure to map virtual addresses to physical addresses for a virtual address space, at least by:
      initializing a first paging register of the set of paging registers by writing a first virtual address in the first portion of the first paging register and a first physical address of a first physical memory segment in the second portion of the first paging register, the first paging register associating the first virtual address with the first physical memory segment of the virtual address space;
      receiving a request to allocate a second physical memory segment to a second virtual address, the second physical memory segment corresponding to a second physical address;
      determining that the second virtual address corresponds to the virtual address space and is contiguous with the first virtual address stored in the first portion of the first paging register;
      allocating the second physical memory segment by:
        identifying a second paging register that is contiguous to the first paging register;
        determining that the first portion of the second paging register is populated with a third virtual address that is non-contiguous with the first virtual address in the first portion of the first paging register;
        moving contents of the second paging register into a third paging register by writing the third virtual address stored in the first portion of the second paging register to the first portion of the third paging register and by writing a third physical memory address in the second portion of the second paging register to the second portion of the third paging register; and
        storing the second virtual address into the second paging register by writing the second virtual address in the first portion of the second paging register and the second physical address in the second portion of the second paging register; and
      receiving a memory access request to the first virtual address stored in the first portion of the first paging register;
      servicing the memory access request by at least accessing the first physical memory address stored in the second portion of the first paging register; and
      prefetching data at the second physical memory segment using the second physical address stored in the second portion of the second paging register as a result of receiving the memory access request to the first virtual address.

16. The system of claim 15, wherein the first physical memory segment and the second physical memory segment are non-contiguous.

17. The system of claim 15, wherein the third paging register is not contiguous with the first paging register.

18. The system of claim 15, wherein the first paging register and the second paging register are organized in adjacent slots in a page table.

19. The system of claim 18, wherein starting addresses of memory ranges are stored in the page table.

20. The system of claim 18, wherein page table maps a virtual memory range to a respective physical memory range within physical memory.

21. The system of claim 15, wherein the set of acts further comprise: a look-up of the virtual address space to determine if the virtual address space is within a set of virtual address space boundaries of an operating system process.

* * * * *